(12) United States Patent
Saksela et al.

(10) Patent No.: US 10,587,970 B2
(45) Date of Patent: Mar. 10, 2020

(54) ACOUSTIC CAMERA AND A METHOD FOR REVEALING ACOUSTIC EMISSIONS FROM VARIOUS LOCATIONS AND DEVICES

(71) Applicant: Noiseless Acoustics Oy, Helsinki (FI)

(72) Inventors: Kai Saksela, Helsinki (FI); Jonas Nyberg, Söderkulla (FI)

(73) Assignee: Noiseless Acoustics Oy, Helsinki (FI)

( * ) Notice: Subject to any disclaimer, the term of this patent is extended or adjusted under 35 U.S.C. 154(b) by 0 days.

(21) Appl. No.: 16/334,097

(22) PCT Filed: Sep. 7, 2017

(86) PCT No.: PCT/FI2017/050631
§ 371 (c)(1),
(2) Date: Mar. 18, 2019

(87) PCT Pub. No.: WO2018/055232
PCT Pub. Date: Mar. 29, 2018

(65) Prior Publication Data
US 2019/0261108 A1   Aug. 22, 2019

(30) Foreign Application Priority Data
Sep. 22, 2016   (FI) ..................................... 20165713

(51) Int. Cl.
*H04R 29/00*   (2006.01)
*H04R 3/00*   (2006.01)
(Continued)

(52) U.S. Cl.
CPC ........... *H04R 29/008* (2013.01); *G01H 3/125* (2013.01); *G01M 3/24* (2013.01); *G01S 3/8083* (2013.01);
(Continued)

(58) Field of Classification Search
None
See application file for complete search history.

(56) References Cited

U.S. PATENT DOCUMENTS

2008/0260167 A1   10/2008  Kim et al.
2012/0027217 A1    2/2012  Jun et al.
(Continued)

FOREIGN PATENT DOCUMENTS

| EP | 3001162 A1 | 3/2016 |
| FR | 3018023 A1 | 8/2015 |
| JP | 5979458 B1 | 8/2016 |
| NL | 9201787 A | 5/1994 |
| WO | 2016148825 A1 | 9/2016 |

OTHER PUBLICATIONS

Finnish Patent and Registration Office, Search Report of Finnish Application No. 20165713, dated Apr. 12, 2017, 2 pages.
(Continued)

*Primary Examiner* — Ping Lee
(74) *Attorney, Agent, or Firm* — Berggren LLP

(57) ABSTRACT

The present invention discloses an acoustic camera which comprises an array of arranged microphones. The microphone arrangement can be organized in planar or non-planar form. The device can be handheld, and it comprises a touch screen for interacting with the user. The acoustic camera measures acoustic signal intensities in the pointed direction and simultaneously takes an optical image of the measured area, and shows the acoustic signal strengths with the taken image on the screen. The device analyzes the acoustic signals and makes a classification for the sound based on the analysis. If necessary, an alarm is given by the acoustic camera. Besides the handheld manual use, the device can be fixed on a immobile structure or fixed to a movable or rotatable device or a vehicle, such as to a drone.

20 Claims, 11 Drawing Sheets

(51) Int. Cl.
*H04R 1/40* (2006.01)
*H04R 19/00* (2006.01)
*G01H 3/12* (2006.01)
*G01M 3/24* (2006.01)
*G01S 3/808* (2006.01)

(52) U.S. Cl.
CPC ............ *H04R 1/406* (2013.01); *H04R 3/005* (2013.01); *H04R 19/005* (2013.01); *H04R 29/005* (2013.01); *H04R 2201/003* (2013.01); *H04R 2201/401* (2013.01); *H04R 2430/20* (2013.01); *H04R 2499/11* (2013.01); *H04R 2499/13* (2013.01)

(56) References Cited

U.S. PATENT DOCUMENTS

| | | |
|---|---|---|
| 2013/0089303 A1 | 4/2013 | Jiang et al. |
| 2013/0272095 A1 | 10/2013 | Brown et al. |
| 2014/0192201 A1 | 7/2014 | Benoit et al. |
| 2014/0241548 A1 | 8/2014 | Kim et al. |
| 2016/0034786 A1 | 2/2016 | Suri et al. |
| 2016/0097838 A1 | 4/2016 | Kim |

OTHER PUBLICATIONS

Distran Acoustic Camera. [online] 2013. [retrieved-as-archived Dec. 6, 2016] from <https://web.archive.org/web/20161206173106/http://www.distran.ch/technology>, 2 pages.

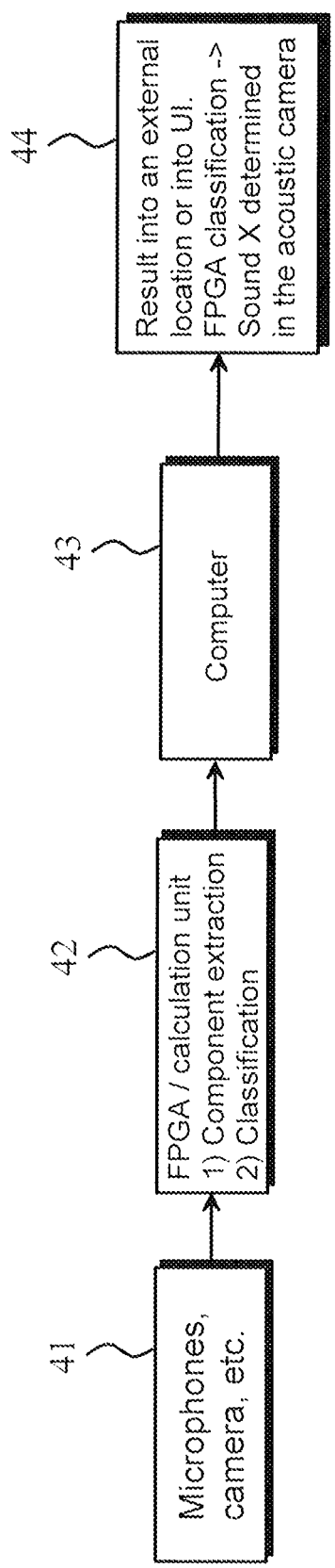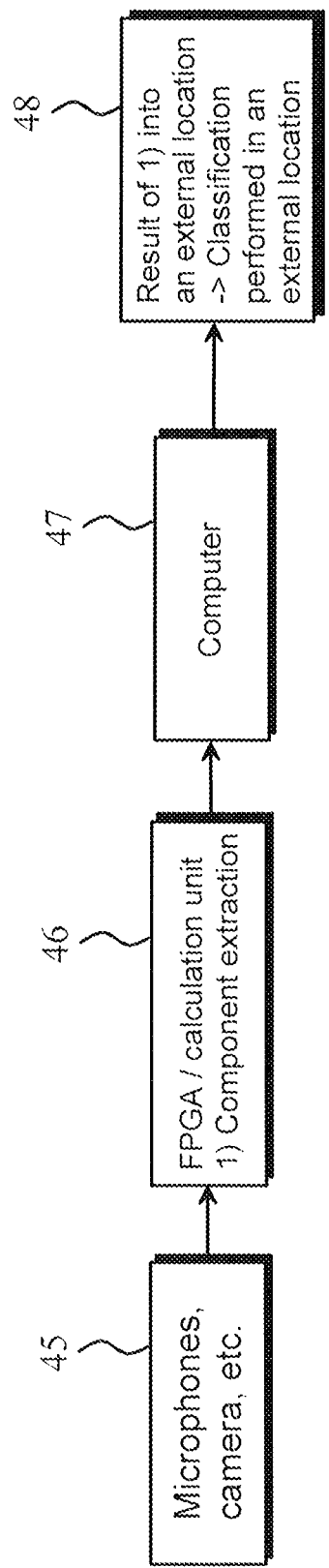
Figure 4a
Figure 4b

ACOUSTIC CAMERA AND A METHOD FOR REVEALING ACOUSTIC EMISSIONS FROM VARIOUS LOCATIONS AND DEVICES

PRIORITY

This application is a U.S national application of the international application number PCT/FI2017/050631 filed on 7 Sep. 2017, which claims priority of Finnish application FI20165713 filed on Sep. 22, 2016, the contents of all of which are incorporated herein by reference.

FIELD OF THE INVENTION

The present invention relates to detecting acoustic emissions in various places and possible audio sources, and visualizing the detected acoustic emissions in a practical manner.

BACKGROUND OF THE INVENTION

Acoustic cameras are devices which collect sound signals from the environment with a microphone array, and which characterize the collected sound signals in some desired way. The acoustic camera may comprise an optical camera as well. Because the distances between each microphone and a specific sound source usually vary, the time delay differences between the received audio signals in each of the microphones can be taken into the analysis. Because the direction of the incoming sound and the time delays are related to one another, a calculation unit of the acoustic camera is able to achieve direction and power information of the acoustic signal. Furthermore, the array of microphones may be tuned in some way in order to create a specifically directed beam in a desired direction for the microphone array.

US 2014/0241548 ("Kim") discloses an acoustic camera with a MEMS microphone array and the internal structure of the microphone array. The structure is a branched one where there can be 2-10 microphones per branch and 2-10 radial-type of branches. A single branch can be formed in a straight-line shape or in a spiral form. Kim shows an acoustic visualization by colors in the display.

US 2014/0192201 ("Benoit") discloses a passive acoustic signal measurement device. The main issue in Benoit is to move the microphone array (or an acoustic antenna) physically across different places of a space while the main device stays in a fixed position. The microphone array is thus connected to the device through cablings. Benoit discloses a round-shaped support structure where the microphones can be attached, also in a round-shaped planar arrangement. Also two optical distance sensors are attached to the support. The data processing electronics are included in the support structure as well. The number of microphones in Benoit is 3-16, and preferably there are 8 microphones. Data can be sent wirelessly to an external processing unit. Benoit can have a handle for handheld use, or the device can be fixed to a tripod. The display of Benoit may also have a touch screen functionality. The acoustic area where Benoit is capable to sense acoustic signals, is from 20 Hz . . . 20 kHz. From the measured acoustic signal levels in the area under investigation Benoit creates a plurality of values in a grid-form. A photograph may be taken, and on top of the taken optical image, the device can add a colored image or a grey-scale image representing created grid of numeral values. The thickness or depth dimension of the device of Benoit can be even less than 5 cm. No MEMS microphones are discussed in Benoit.

The problem of the above solutions is that many of the prior art solutions are physically quite large, and thus they require unnecessarily large space for the housing of the acoustic camera. This further leads in more difficult handling of the acoustic camera, decreasing its usability in various spaces and different measurement situations. Also the frequency range is very limited in some known solutions (20 Hz-20 kHz), and the resolution and accuracy of the acoustic picture is limited if there are only eight microphones in use. Furthermore, prior art publications do not perform any classification or naming for the measured acoustic emissions.

SUMMARY OF THE INVENTION

The present invention introduces an acoustic camera comprising a housing, an array of microphones configured to collect acoustic sound information and to convert the acoustic sound information into analog or digital sound signals; where the acoustic camera is characterized in that it further comprises:
  processing means configured to divide the sound signals into descriptive components and to determine the sound levels in a plurality of directions in a field of view of the acoustic camera;
  the processing means configured to convert the determined sound levels into a color map with different colors visualizing different sound levels;
  an optical camera configured to take an image or video of the field of view; where
  the processing means configured to combine the color map with the taken image or video, thereby illustrating acoustic emissions as a combined image of the field of view of the acoustic camera, where
  the array of microphones, the processing means and the optical camera are integrated in the housing, wherein the acoustic camera further comprises
  a classification means configured to determine at least one classification result for the analysed sound signals,
  classification is performed using a data table, which comprises data of the descriptive components and at least one corresponding name or code describing the source or reason of the at least one sound in the collected acoustic sound information,
  where an initial data table can be cognitively updated by the user.

Furthermore, the inventive idea comprises a corresponding method for measuring, processing and visualizing acoustic signals, wherein the method comprises the steps of collecting acoustic sound information by an array of microphones and converting the acoustic sound information into analog or digital sound signals. The method is characterized in that it further comprises
  dividing the sound signals into descriptive components and determining the sound levels in a plurality of directions in a field of view of the acoustic camera;
  converting the determined sound levels into a color map with different colors visualizing different sound levels;
  taking an image or video of the field of view by an optical camera; and
  combining the color map with the taken image or video, thereby illustrating acoustic emissions as a combined image of the field of view of the acoustic camera, where the method further comprises the steps of determining at least one classification result for the analysed sound signals, performing classification by using a data table, which comprises data of the descriptive components and at least one corresponding name or code describing the source or reason of the at least one sound in the collected acoustic sound information, where an initial data table can be cognitively updated by the user.

The inventive idea also comprises a corresponding computer program for measuring, processing and visualizing acoustic signals, where the computer program is executable in a processor in a form of computer program code. The steps of the computer program implement the corresponding method steps, when the computer program is executed in the processor. The computer program can be embodied in a non-transitory computer readable medium.

BRIEF DESCRIPTION OF THE DRAWINGS

FIG. 4a illustrates a process flow example where the classification of the sound is performed within the device, FIG. 4b illustrates a process flow example where the classification of the sound is performed in an external location.

DETAILED DESCRIPTION OF THE EMBODIMENTS

The present invention discloses an acoustic camera which is provided to analyze and present the incoming acoustic signals to the user in a sophisticated manner. In one embodiment, the acoustic camera is a handheld device and all main parts are implemented within a single housing; except a possible external loudspeaker usable as a sound source.

Figure 1:
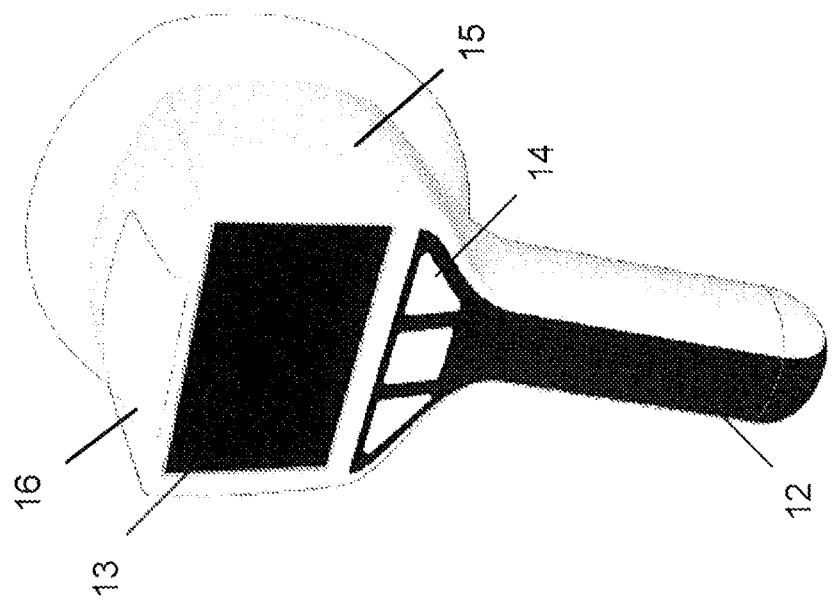
FIG. 1 illustrates an external view of the acoustic camera according to the invention, showing two sides of the actual device.
Figure 1:
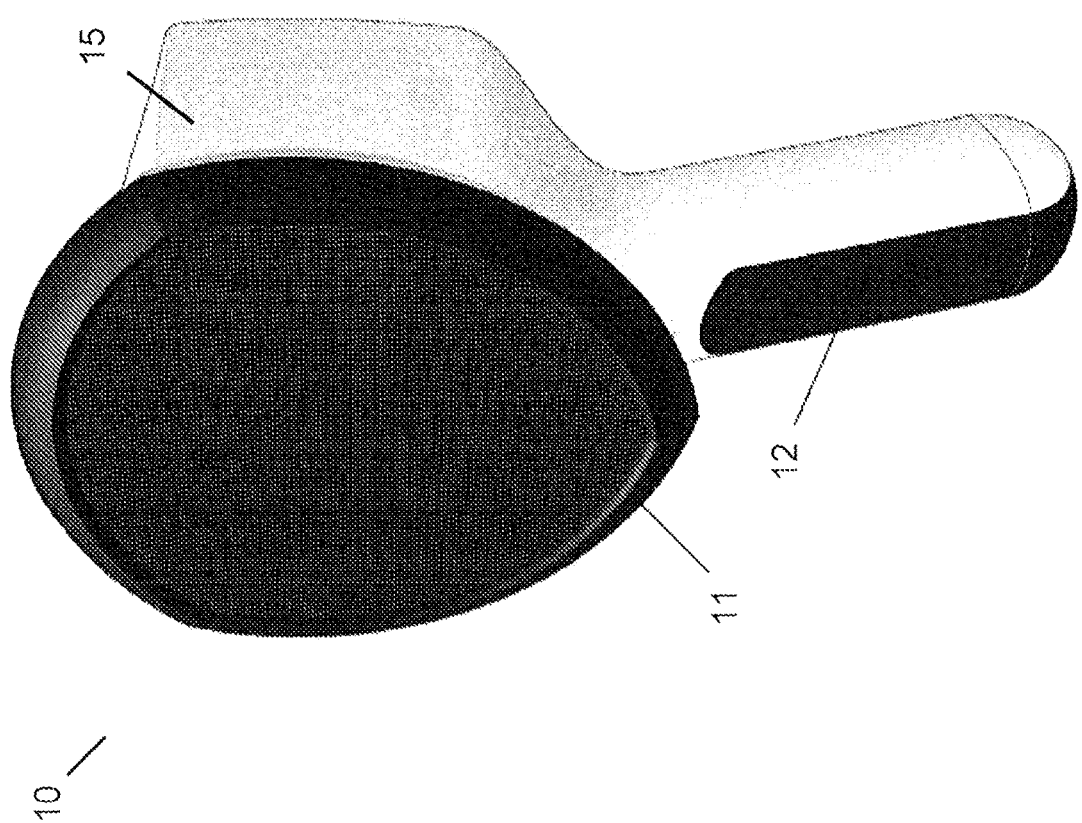

One embodiment of the acoustic camera and its possible outer design is illustrated in FIG. 1 from two different viewing directions. Acoustic camera 10 comprises a housing 15 which comprises the functional components in the upper part of the acoustic camera and a handle 12. The handle may comprise elastomeric material partly on its outer surface (shown in darker color). The sensing end of the housing 15 is rounded by a frame 11, which is also preferably made of an elastomeric material. The frame 11 has a rounded delta shaped form in one embodiment and the end wall of the housing 15 restricted by the frame is a planar end wall (depicted as black surface). When looking at the image on the right-hand side, a touch display 13 can be seen as a rectangular element, acting thus as a user interface as well. The display locates in a parallel alignment with the above mentioned planar end wall, in the opposite end of the housing 15. Beneath the touch display 13, there are hardkeys 14, three to be exact in this example. The hardkeys provide additional user interface for selected functionalities of the acoustic camera 10. Alternatively, there can be a selected number of hardkeys. Furthermore in another embodiment, the keyboard may comprise a scroll wheel acting as an input means for the user.

Behind the planar end wall of the housing 15, a plurality of microphones are located in a selected arrangement. In one embodiment, there are 32-256 microphones as an array of microphones, and in a more specific example, 124 microphones may be used. The microphones are preferably MEMS microphones.

The housing of the acoustic camera can comprise also connectors for external data transfer. In one embodiment, USB and Ethernet connectors may be used. The connectors may be placed just below the top cover of the housing, on the upper side of the display. A lid 16 shown in FIG. 1 may be opened manually by the user and the connectors are placed under lid 16.

Figure 2:
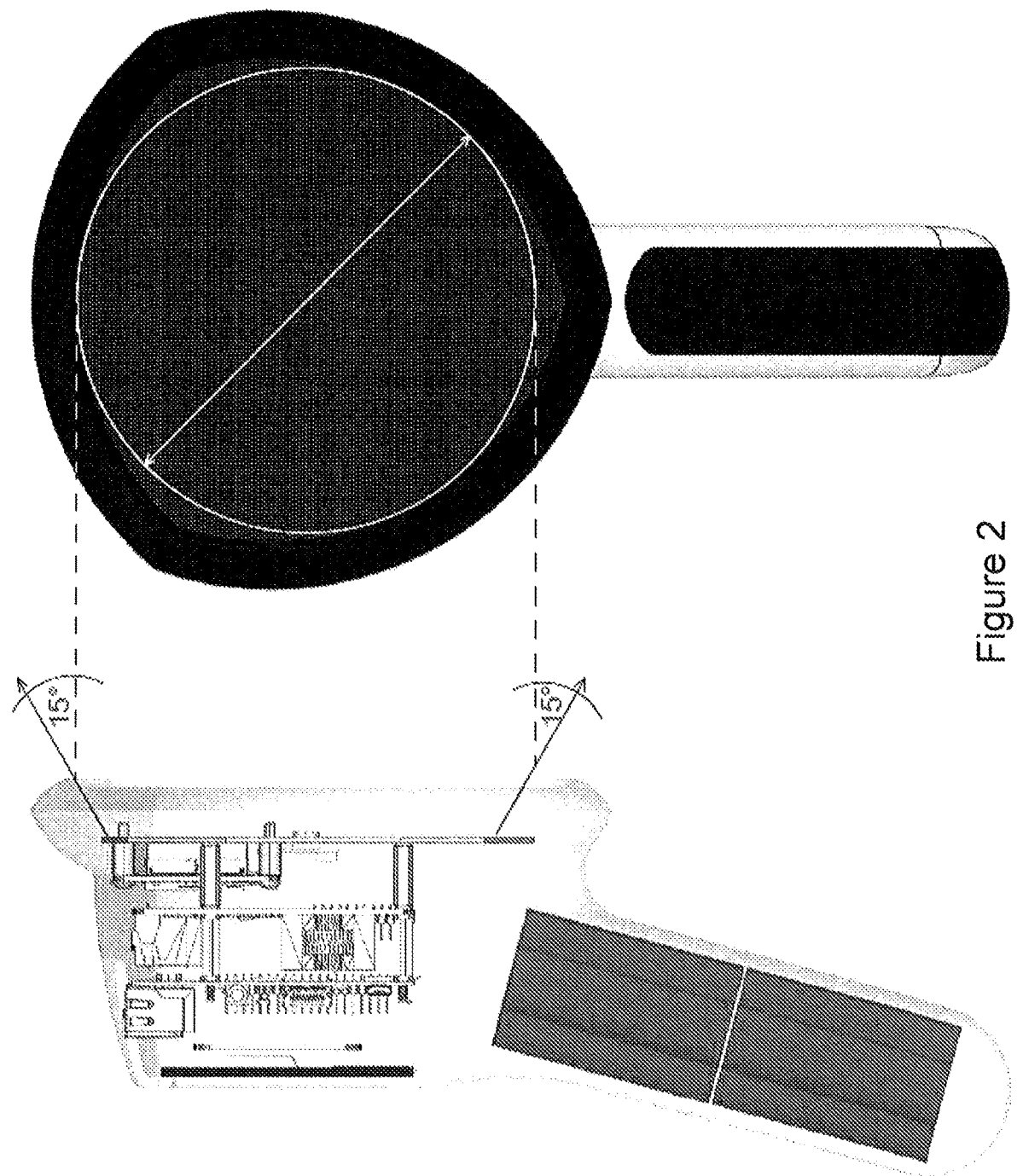
FIG. 2 illustrates a vertical cross-section of the acoustic camera showing some of the main functional elements inside the device.

A cross-sectional view of the acoustic camera can be seen in FIG. 2, from a side-view in the left-hand side and from the assumed direction of a examined acoustic source in the right-hand side. In the left, cross-sectional illustration, the left side of the acoustic camera is occupied by a display which is preferably an LCD display. The display is connected to a display driver unit, shown in parallel direction with the display. The following vertical element is the computer unit. In the righternmost part of the cross-section of the acoustic camera, there is the array of MEMS microphones on a microphone PCB, and each microphone is an omni-directional one. In this example, the optical camera is placed in the middle of the microphone PCB. The longer vertical plate second from right is a power board.

Figure 6A:
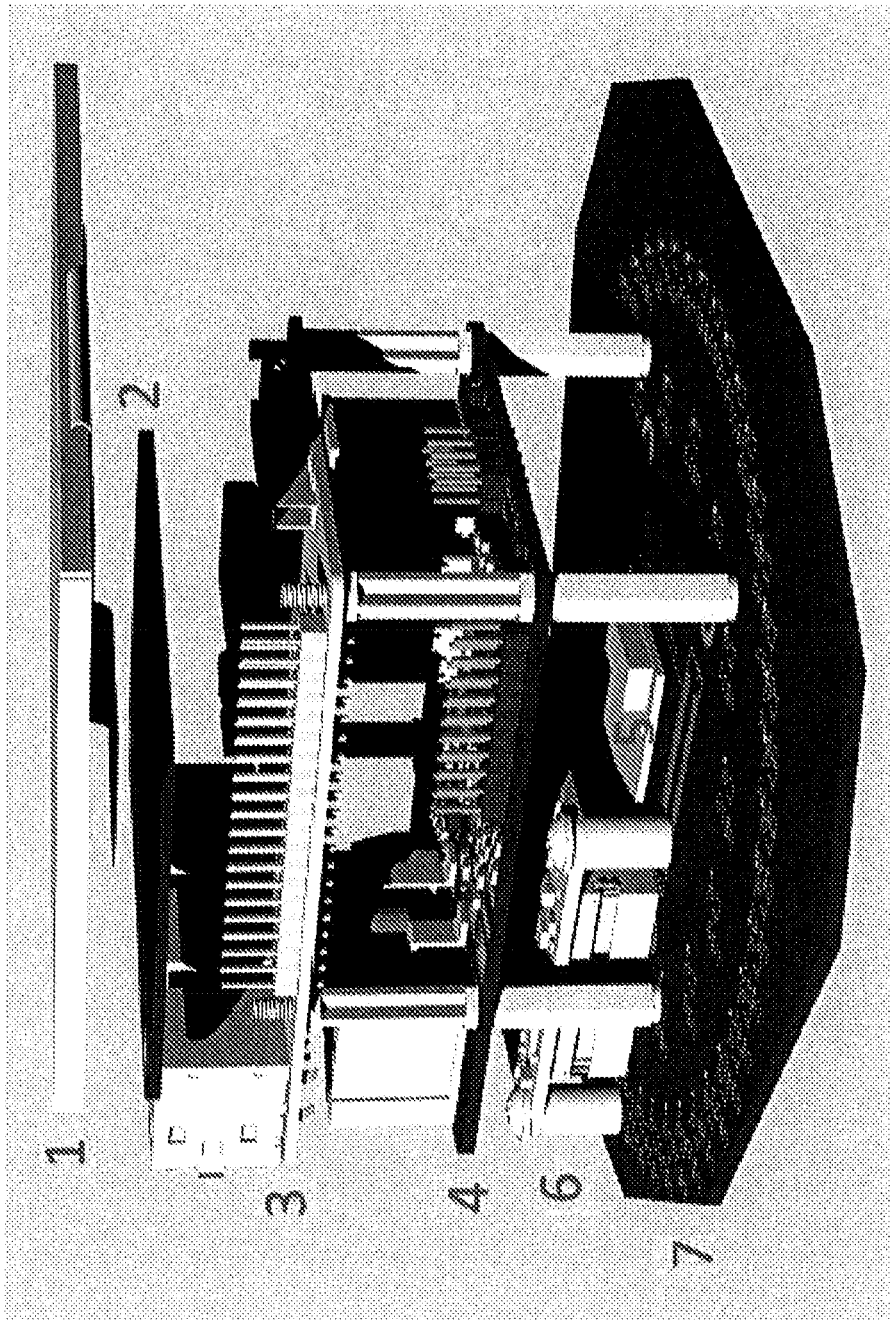
FIGS. 6a-c illustrate various views of the inner structure of the acoustic camera.
Figure 6B:
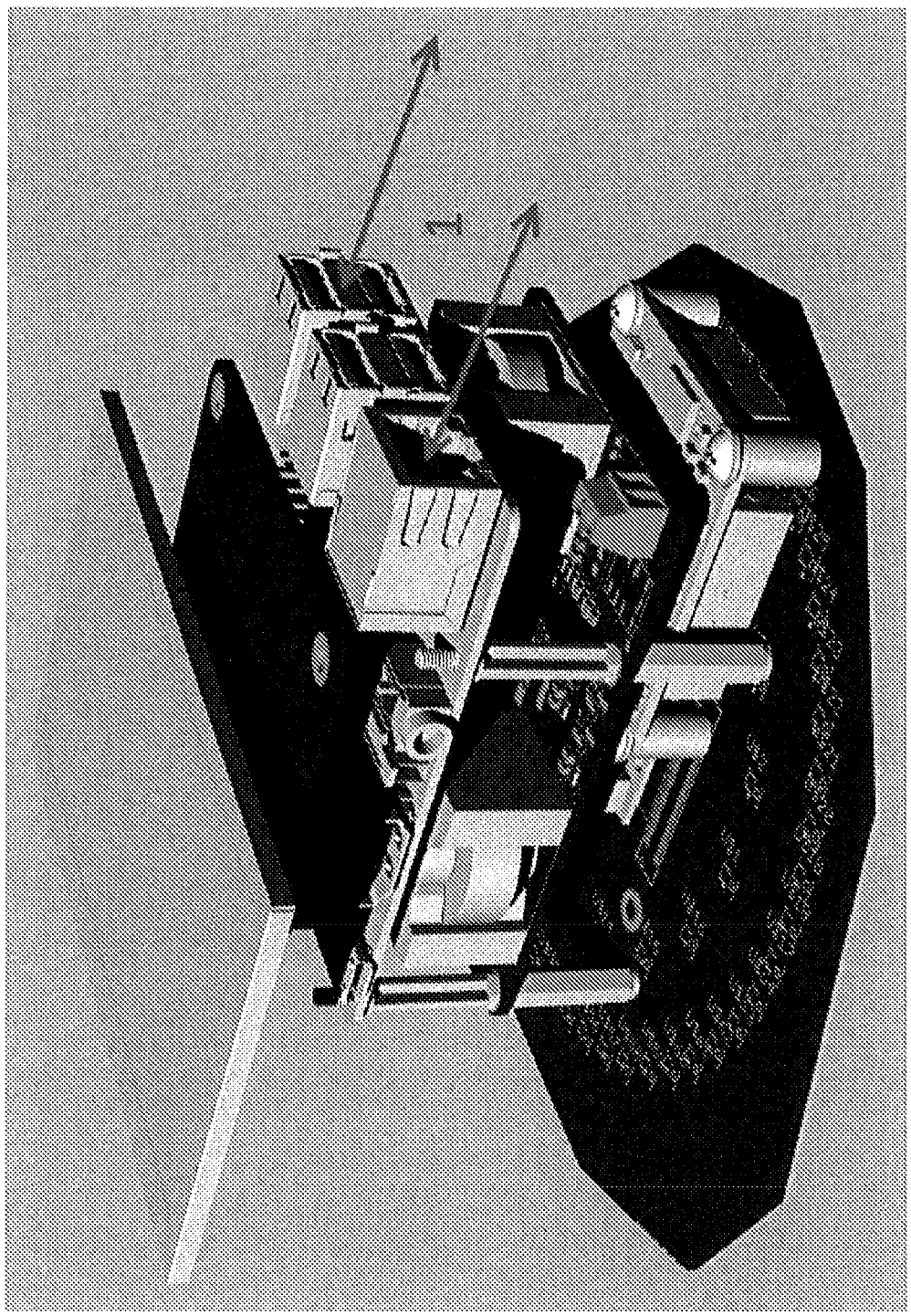
Figure 6C:
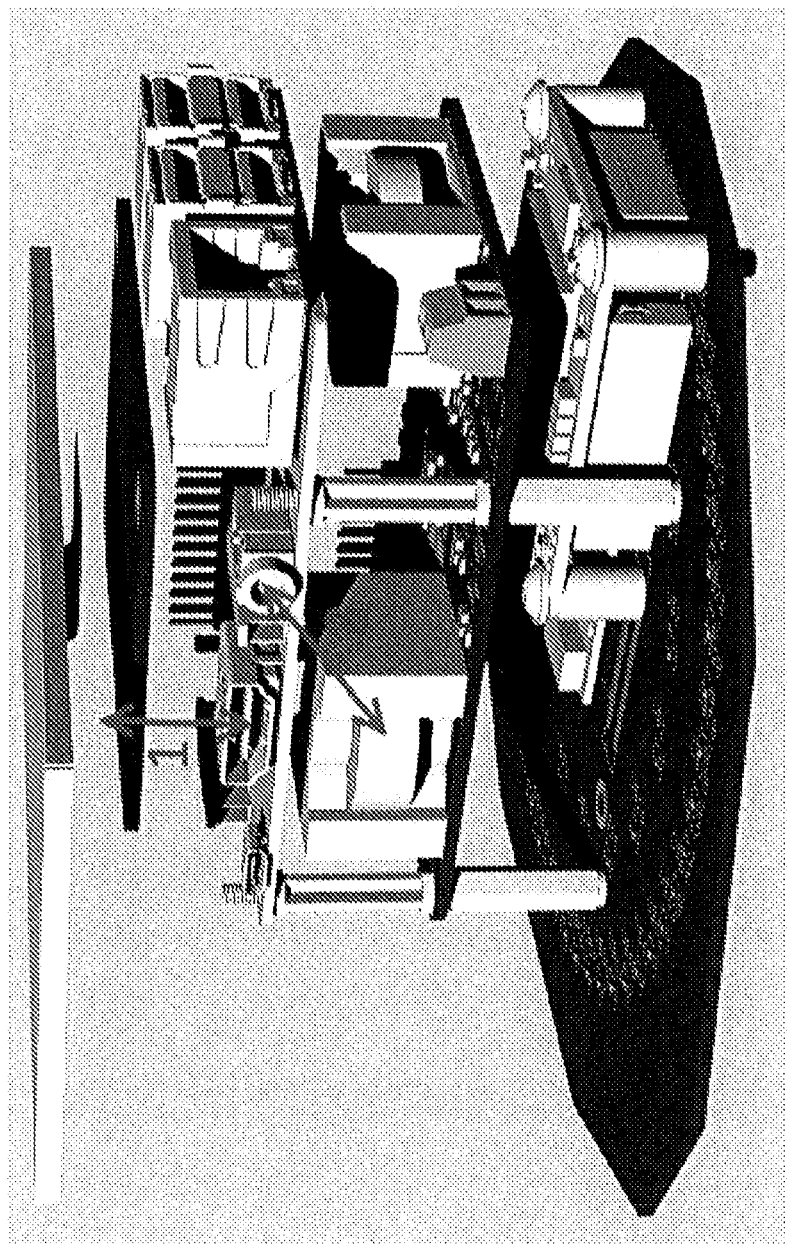

The short plate between these plates is an FPGA board (FPGA=Field-programmable gate array). The FPGA performs the filtering for the sensed acoustic signals received by the microphones. The FPGA further performs the directional analysis, and based on this analysis, it sends the acoustic image to the computer unit. Going back to the functionalities in the computer unit, the computer unit combines the acoustic image information received from the FPGA with the image achieved by the optical camera. Furthermore, the computer unit may process the data in order to visualize the achieved information in the best way on the screen. The time-averaging length of the measurement can be selected by the computer unit, and also the width of the colored area which points out the noise sources. Furthermore, the computer unit can send the analysis results into an external location, and show the result made in the classification step of the acoustic signals; see more details in this regard later. Back to FIG. 2, in the upper left-hand side part of the cross-section, there is a compartment for external connectors. The connectors comprise USB and Ethernet connectors for external data transfer. The data obtained by the acoustic camera can thus be transmitted into an external location which can e.g. be an external computer or server located in the cloud which is reachable over an internet connection. Referring also to earlier FIG. 1, the external connectors can be placed under the lid 16 visible in the right-hand side illustration. FIGS. 6a-c illustrate more of the inner structure of the acoustic device.

Figure 3:
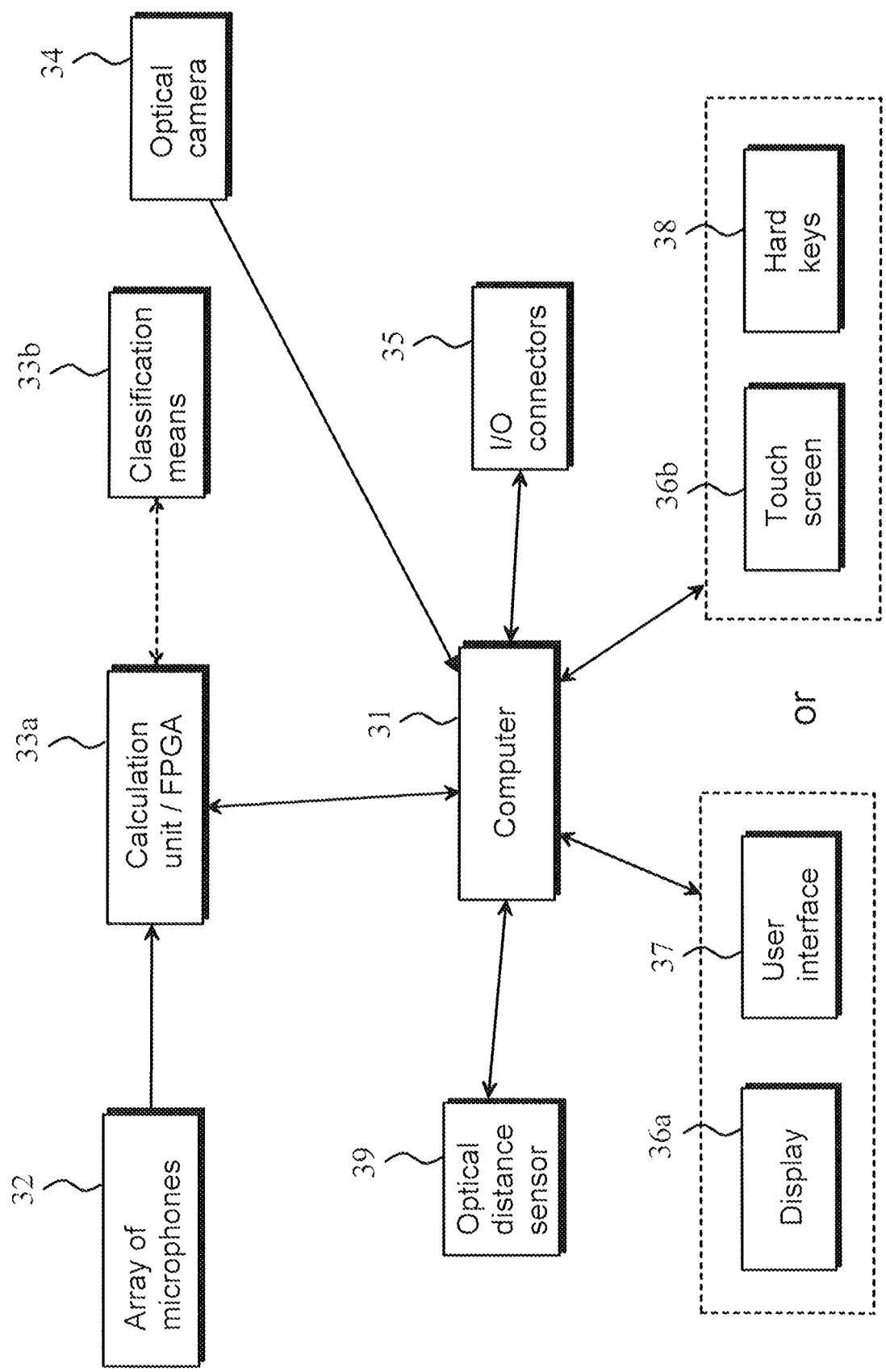
FIG. 3 illustrates a flow chart of the main functional elements of the acoustic camera.

FIG. 3 illustrates the main functional elements of the acoustic camera 10, as a block diagram showing also the directions of the information flow between different functional elements. Discussed in the order of information or signal flow, the main sensing part of the acoustic camera regarding the audio signals is formed by a array of microphones 32. Preferably, every used microphone 32 is specified to have an omnidirectional polar pattern. For instance, the microphones are installed on a back plate in the housing of the acoustic camera, resulting in an effective directionality of the microphones towards the direction where the acoustic camera is pointed at. This happens partly because the back plate acts as a reflector, and the resulting effective beam of the array of microphones will thus have a main direction away from the user of the acoustic camera (i.e. in the pointing direction of the device). As discussed earlier, the number of the microphones can preferably be selected from 32 up until to 256 microphones. A calculation unit 33 performs desired processing steps for the obtained signals by the microphone array 32. The calculation unit performs various mathematical operations for the obtained signals, comprising also filtering. By filtering with appropriately selected cut-off frequencies, undesired low- or high-pitched noise can be eluded. The results obtained from the operations made by the calculation unit 33 comprise different arrival directions of the sound signals, and sound intensities in each of these arrival directions. The calculation unit 33 can be implemented as an FPGA unit, i.e. as a programmable integrated circuit.

In addition to collecting acoustic information by the microphone array 32, the visual environment can be simultaneously photographed by an optical camera 34, when the device is in an active operation mode (i.e. "listening" to the acoustic signals with a given position and alignment of the acoustic camera). In the actual use situation of the acoustic camera, it can be fixed into a certain position and pointing direction (in case of a device in a fixed location), or pointed manually to a desired direction (in case of a handheld device). In both ways, the acoustic measurement is performed when the device is placed so that it points in a specific direction. A new position of the acoustic camera can be obtained by moving the acoustic camera manually or operationally (i.e. by a flying drone) to a new position and pointing direction. In this way, a serial measurement covering a larger area (e.g. a horizontal panorama of 360 degrees) can be performed through a plurality of measurements.

The computer 31 is the next functional unit where both the calculation results from the calculation unit 33 and the image information obtained by camera 34 are fed to. The computer 31 changes the acoustic signal intensity information into a color map where different colors visualize different intensities of the sound in different directions. In one possible example, the strongest sound intensities may have a colour of dark red, and the following acoustic signal values with less intensity may be visualized with regular red, and thereafter, in orange, yellow, green, turquoise and blue. Usually, regarding a point-like sound source, a spot in dark red points the center of the sound source, and circles of red surrounds the dark red zone, the orange circle or loop surrounds the red loop, and so on, indicating the decreasing levels of sound intensity. Of course, the selected colors are chosen merely for visual purposes, and the colors and their order could also be something different.

The computer 31 then combines the color map of the sound intensities onto the image taken with the optical camera 34. The calculations and the combination of the acoustic color map and the visual image are performed so that actual sound sources conform with their locations within the image as accurately as possible. The image can be a still image taken with the camera, or a video recording taken with a video camera, or a single image among the video recording. In other words, the addition of the acoustic color map can be performed in a single still image, or in a group of images forming a video recording.

The input/output interface is implemented with I/O connectors 35, located preferably under a lid of the housing. The I/O connectors 35 may comprise an USB and/or Ethernet connector for external data transfer. The I/O connectors may also comprise external power connector for connecting an external battery into the acoustic camera. This is usable in situations where somehow the internal batteries are not available or their charge is empty.

The presentation of the combined image is shown in the display 36a which can locate directly in the opposite side of the housing in relation to the microphone array. Together with the traditional display 36a, the interface between the user and the acoustic camera requires input means, which is named here as user interface 37. This comprises keys and possible other kinds of buttons or sliding clutches or a keyboard which can be used as an input means. Alternatively, the display can be a touch screen 36b, allowing both the input options for the user and the displaying of the obtained image and/or other required information on the screen. Additionally, besides the touch screen 36b, there can be at least one dedicated or programmable button or hard key 38 fixed in the housing e.g. below the touch screen (as shown in FIG. 1; hard keys 14).

Alternatively, the display outputting the results obtained by the camera may locate in a remote external location. Also in such a case, the user interface can locate in an external location, and in one example, the user can operate the acoustic camera remotely through an internet connection. In the latter case, the acoustic camera may then locate in a fixed arrangement or at least it is attached to a structure or placed on a pedestal.

The acoustic camera can be provided with an optical distance sensor 39. When the acoustic camera is in the measurement position with the desired alignment angle towards the surrounding area or spot to be measured, the optical distance sensor 39 can be activated. The optical distance sensor 39 can transmit a light beam, e.g. with a LED, and measure the time instant of the reflected light. The optical distance sensor 39 may also be based in IR transmission and triangulation. Any other suitable distance sensor may also be used.

FIGS. 4a and 4b illustrate logical optional examples on how to implement the calculation and analysis steps for the acoustic signals. A first analysis example is shown in FIG. 4a. At first, both acoustic and visual data is sensed and collected by the array of microphones, and by an optical camera, respectively, in step 41. After that, an FPGA or calculation unit performs an extraction into components for the acoustic signal received from a particular direction, marked as "1)". After that, as step 2), the FPGA or calculation unit performs a classification determination for the results achieved in step 1). The actions made by the FPGA or calculation unit are marked with 42. The results obtained in the FPGA or calculation unit are fed into the computer 43. Concerning the presentation of the obtained results in this example, the results are transmitted into an external location, or as an alternative option, they are shown in the user interface (UI) of the device, such as the display of the device. Furthermore, the classification result of step 2) can also be saved into an external location, or shown in text format in the display of the acoustic camera. The phase of presenting or saving the results is marked as step 44. The main characteristic of the steps according to FIG. 4a is that all main analysis steps are performed locally within the acoustic camera.

FIG. 4b illustrates a second example of the possible analysis made in the present invention. The steps are otherwise the same compared to the situation in FIG. 4a, but steps 42 and 44 are changed. After receiving the acoustic and visual information with the microphones and the optical camera in step 45, the FPGA or calculation unit is configured to merely extract the acoustic signal from a particular direction into components, as step 1). No classification of the obtained acoustic components is performed at this stage. The sound component information is however fed into the computer 47, and further, that information is transmitted into an external location 48. Regarding the classification of the acoustic signals, it is performed outside the acoustic camera. It may be an external server or PC, or any external device accessible through an internet connection. The externally obtained classification result can be finally output e.g. through an external user interface like a PC screen or possibly through an internet application or a smartphone application, for instance. The main characteristic of the steps according to FIG. 4b is that the analysis steps are divided between the acoustic camera and the external device behind the internet connection.

A practical embodiment on how the classification is performed with using a data table, is illustrated later in FIG. 7. Referring back to FIGS. 4a and 4b, the phase 1) in steps 42 and 46, i.e. the component extraction step, can be performed by using a time windowed portion of the sound signal, Wavelet analysis, Cepstrum calculations, by using FFT calculations ("Fast Fourier Transform"), or by using statistical numbers, for instance. The present invention may however apply some other suitable method as well.

The phase 2) in step 42 can be implemented by using artificial neural networks, in one embodiment of the invention.

The classification of the received sound(s) can be used for two different types of information. At first, the time windowed portion of the sound signal itself extracted from a given direction can be fed into the sound classification block performing the classification. Alternatively, the sound signals extracted from a given direction can be converted into metadata. Such metadata is defined to comprise statistical quantities which correspond with sound information received from a given direction, and thus require less space and bandwidth to process. This kind of metadata can then be fed into the classification algorithm.

In relation to the above, in the example of FIG. 4b, the sound component information can be transmitted by the computer into an external location which can be an external device. In other words, the transmitted signals are sound signals in real-time, or at least close to the real-time taken into account the inevitable delays emerging from the components of the device.

Alternatively, the sound signal conversion into a piece of metadata is performed, and after that, the metadata is transmitted by the computer into an external location.

The classification algorithm as such works as a cognitive process applying history data of earlier received sounds and the classification data of those sounds. When a certain distinctive sound is received for the first time, the user may teach the device by entering the classification information of the sound through the I/O interface, in an embodiment. For example, when examining a gas leak within a pipe, it can be seen as a clear mark on the edge of the pipe in the screen of the acoustic camera. The user can then classify the sound as a certain type of gas leak (e.g. a critical or non-critical gas leak). Possible types of classifications are numerous, ranging from malfunctioning devices, or error types in automated systems or machines into leaks e.g. in various pipes, tyres, chambers, housings, airconditioning systems, or generally in inner spaces or window seams etc. Further classification options can be electric discharges, acoustically weak locations within premises and in fixed structures within such premises, such as office spaces, libraries, class rooms and concert venues, just to name a few examples.

In another embodiment, the teaching is performed beforehand. In such a case, the user can use the device and the classification functionality without having to teach the device accordingly at first.

Figure 8:
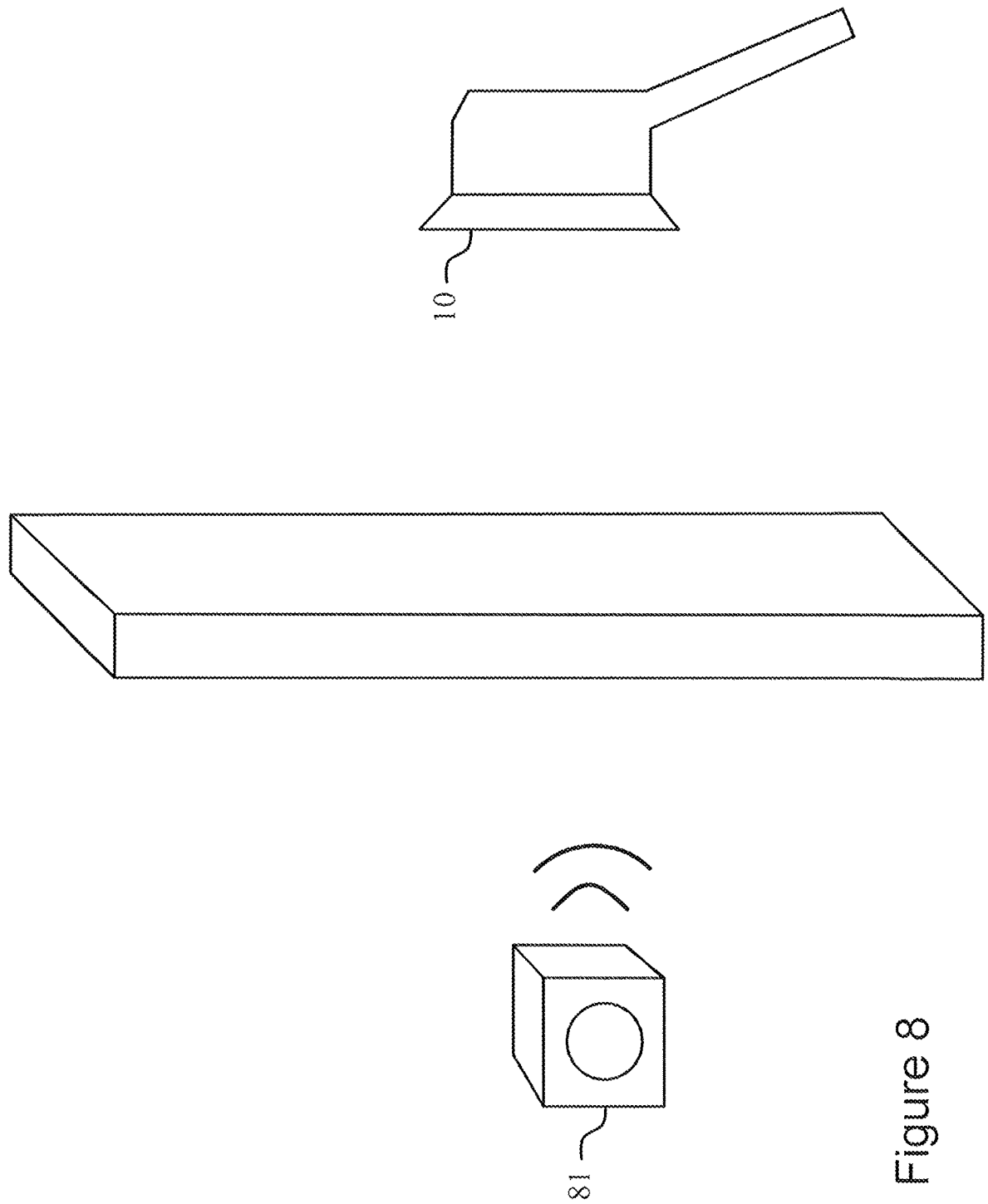
FIG. 8 illustrates acoustic testing procedure with an external loudspeaker.

In using the acoustic camera, there are two main situations; at first the acoustic camera can measure the current acoustic environment within a certain space, without any additional excitation signal present near the acoustic camera, such as a loudspeaker as a sound source. In this way, the acoustic camera will record the natural sounds of the environment, and it may track any sounds which give a hint of a malfunction of a machine, or leak within a pipe. The second main situation is to check the acoustic isolation or propagation properties within a dedicated space, and this cannot be realized in a completely silent environment. This situation can be implemented by placing a dedicated sound source such as a loudspeaker outputting a selected volume and type(s) of sound e.g. behind a wall of the measured space. When using the acoustic camera e.g. in an office room and by pointing the acoustic camera to possible weak spots of the site, such as towards the gaps between wall elements, or other non-continuous places within the walls, it is possible to track the weak spots of the structure when the loudspeaker is on e.g. in an adjacent office room. It is possible to change the properties of sound output from the loudspeaker, e.g. by selecting noise with specific frequency content, such as white noise or pink noise, or filtered noise. Alternatively, the sound created by the loudspeaker may consist of a single given frequency (i.e. a continuous beep tone), or other pre-recorded or generated piece of natural or artificial sound. Later, FIG. 8 illustrates this scenario in a simplified image.

Figure 5:
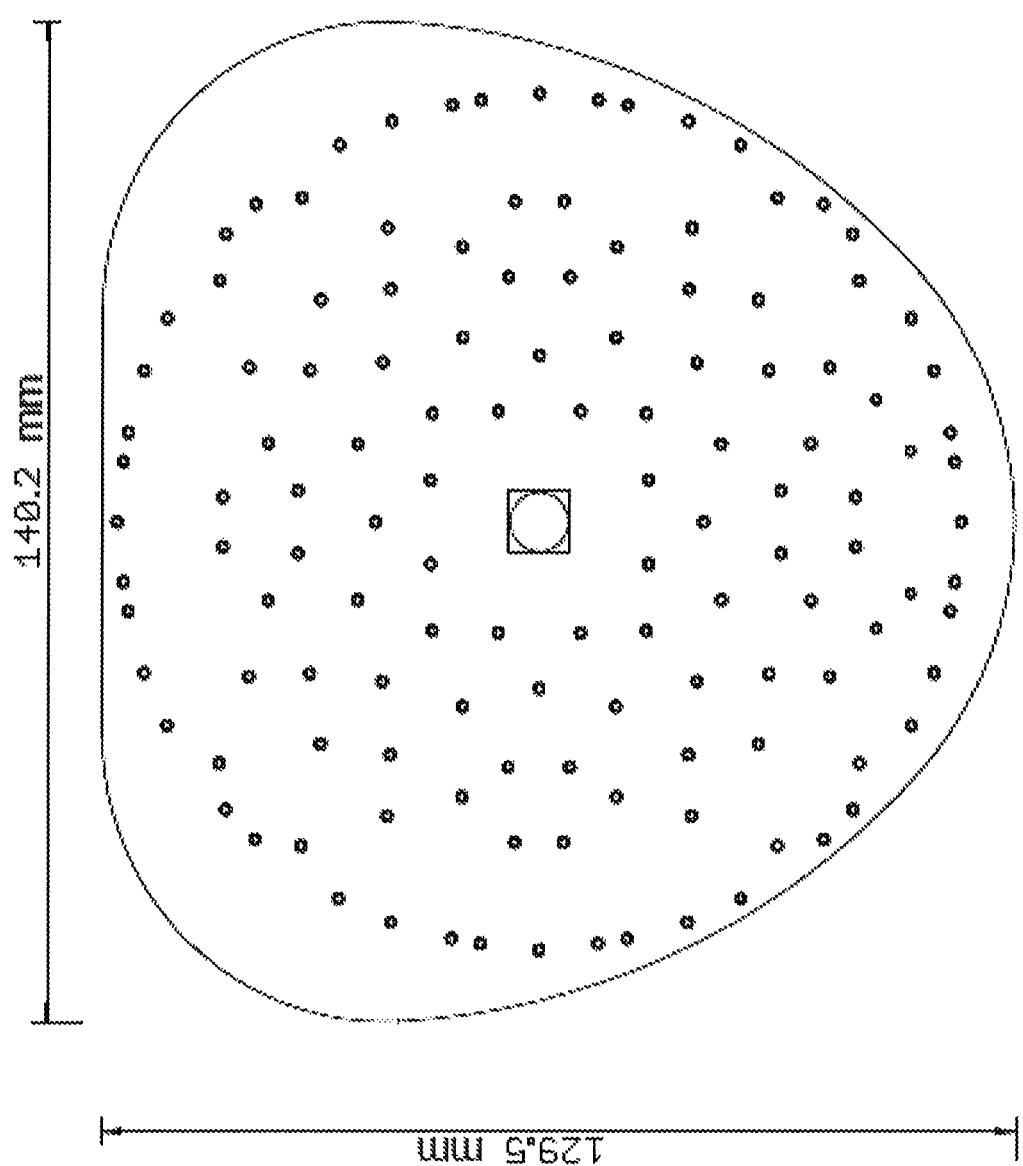
FIG. 5 illustrates an example of positions selected for an array of 124 microphones.

FIG. 5 illustrates an example of a possible microphone assembly used in connection with the acoustic camera. In this example, 124 microphones are placed in an arrangement, which is an advantageous arrangement, but of course not the only applicable number of microphones nor the only advantageous arrangement in the present invention. The microphones can be seen as small circles in the cross-section of the device. It is notable that this is not the only usable arrangement for the microphones but merely an example presenting a single option among the plurality of possible options.

FIG. 6a illustrates a 3-dimensional image of the internal structure of the acoustic camera, in one embodiment of the invention. The uppermost element in the figure is an LCD display. As an example for its size, a 5" display may be used. Below the display, there is an LCD driver board (shown in black). This driver board is simplified in the image and thus, it comprises a thin circuit board. The LCD driver board can include additional components, and this board can be fixed in the device by connecting it to the inner surface of the housing from its sides. The following element below the LCD driver board is an embedded computer board (shown with white edges). Underneath this board, there is a power board (shown in black) providing power into different component of the device. Right in the middle, below the power board, there is a camera board comprising the optical camera. Towards the left from the camera board, an FPGA board is placed. The lowermost plane shown in black is a microphone PCB. In an advantageous embodiment, the shape of the microphone PCB is a rounded triangle, or a rounded delta-formed shape.

FIG. 6b illustrates another view of the inner structure of the acoustic camera, showing also the connectors. They are placed on top of the embedded computer board, and this embodiment has five connectors pointing to the right but of course the number of connectors may vary depending on the needs of the device.

FIG. 6c illustrates another view of the inner structure of the acoustic camera. Two further connectors are now better shown, and they both locate on top of the embedded computer board as well. The connector on the left is an HDMI connector. The connector on its right hand side is a standard 3.5 mm Stereo connector which can be located on the outer surface of the housing and thus provided with inner cablings between the circuitry and the housing. One possible location for the 3.5 mm Stereo connector is located beneath the LCD display.

Figure 7:
FIG. 7 illustrates an example of a data table used in the classification process of the measured acoustic signals.

FIG. 7 shows an example of a data table 71 which is used by the classification means 33b in the classification of received acoustic signals. The data table 71 is shown as a two-column table. In the left column, descriptive components of sounds are listed as "Descriptive component A", "Descriptive component B", and so on, with five listed groups of combinations named as A, B, C, D and E in this embodiment. The right column lists a group of reasons behind various acoustic emissions, and these clear-worded reasons form an example of various classification results. The reason may be a name, or a code, or a type, and the information may further comprise a magnitude or severity information, e.g. as a magnitude of a gas flow. In this example, descriptive components A correspond to a non-critical gas leak, B correspond to a critical gas leak, C correspond to a non-critical electric discharge, D correspond to a critical electric discharge and finally, descriptive components E correspond to a female voice. The data table 71 thus links the descriptive component groups with a corresponding reason creating such an acoustic emission. For instance, when the acoustic emission is noted to comprise descriptive components D sufficiently well, or if the descriptive components are nearest to the components D but farther away from A, B, C and E, the classification algorithm determines that the reason for such an acoustic emission is a critical electrical discharge.

The data table 71 may initially comprise none or just a few different classifications, but the system may have cognitive capabilities so that the data table may be completed during the actual use of the acoustic camera. It is e.g. possible that during a testing process, the acoustic camera is set to listen to an actual gas leak from a pipe, and the result is shown on the touch screen. The user may input the name or type or other information of the sound source through the touch screen, and the corresponding descriptive components of sound can be added to the database with the newly input sound description. This way the classification system becomes cognitive and it obtains better results after each added piece of classification data.

In one embodiment, the classification means 33b determines more sophisticated results of the examined physical part or the examined machine. This means that the name or the code in the data table 71 may comprise information of criticality of an error in the functioning of the device, or a parameter describing a condition of a machine or of a part of a machine. For instance, the classification results may be listed like "Condition of the bearing is average (Non-critical)"; "Condition of the bearing is poor (Critical)". In one embodiment, the classification means 33b provides a reason and a related magnitude value based on the analysis. The output result may e.g. be like "A gas flow: 1.5 cm$^3$/s". In this way, the acoustic camera acts like a measuring device for magnitudes of a gas flow, e.g. along a pipe. Various other measurable characteristics and error situations can be tracked this way as well.

Furthermore, a critical classification result may be completed by adding an alarm signal (either in the device or to an external device), or an alarm message on the screen of the acoustic camera. For instance, an alarm signal in the acoustic camera may be created by a dedicated LED light, which is turned on, when a critically classified acoustic result is obtained.

FIG. 8 illustrates the use scenario where the acoustic properties of various structures, elements, components, housings or general internal premises can be tested. This requires an external loudspeaker 81 which can be placed e.g. behind a wall in an adjacent room of an office space. The loudspeaker 81 might be placed inside a large pipe, or inside a sealable container, just to name a few examples.

As it is earlier described, the loudspeaker outputs a selected artificial or natural sound with a selected volume and frequency range, and the acoustic camera 10 is used to measure these acoustic signals behind the physical structure to be examined. If the measured structure is an internal wall in office or factory premises, the pointing direction of the acoustic camera 10 may be moved across the joint sections of the wall with other walls or ceiling, in order to find the possible weak spots of the structure. By this way, it is possible to track down possible discontinuities in a structure, broken areas or sections, and even more complex paths of noise propagation inside the buildings, for instance. One option for measuring acoustic properties within a multi-room office space is to perform a sequence of measurements, where the measurements are carried out over each internal wall of an office, for instance.

Figure 9:
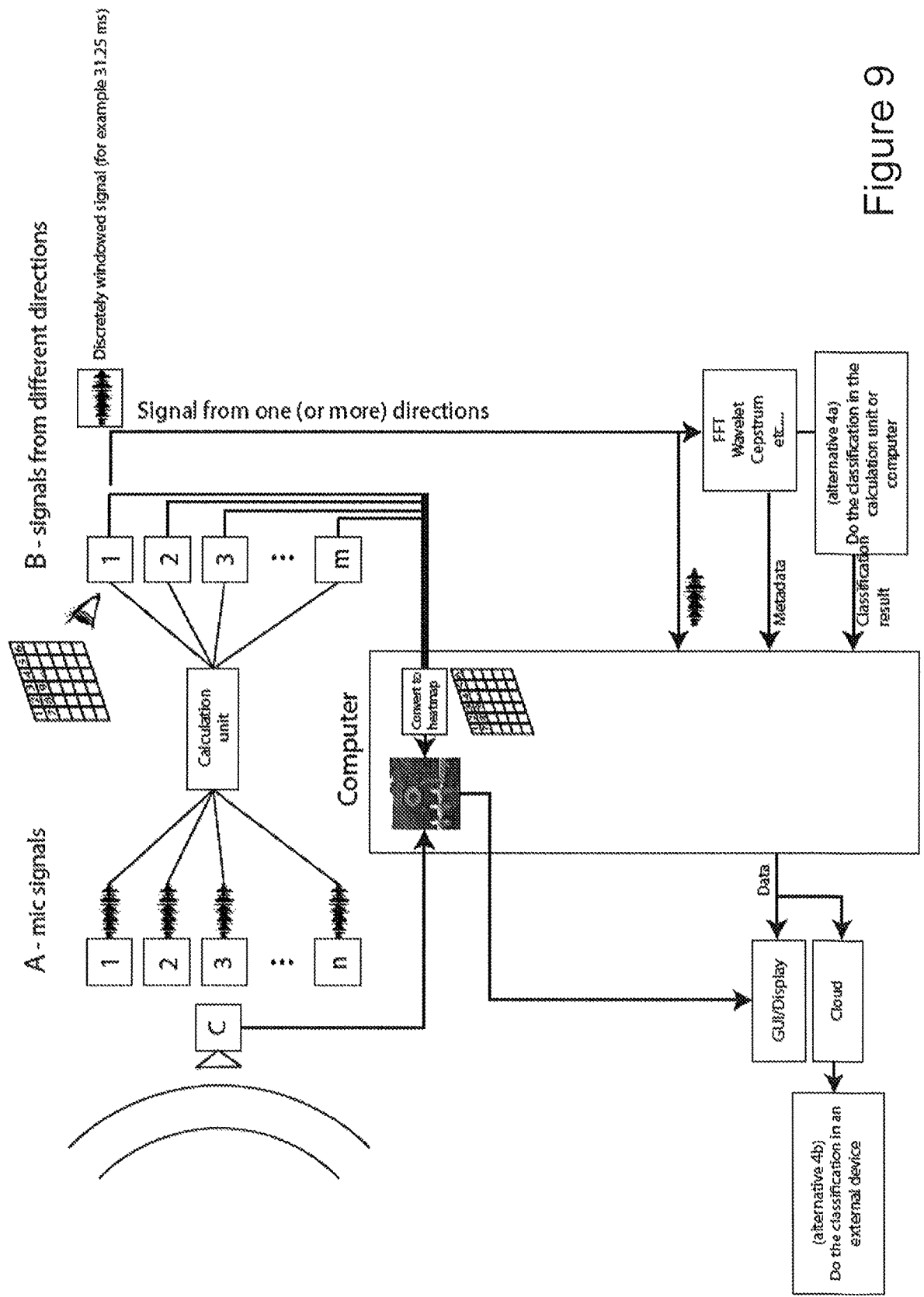
FIG. 9 illustrates a summarizing flow chart of the signal flow and sound analysis process made in the present invention.

FIG. 9 further summarizes the various steps performed in the sound analysis process according to the invention. At first, acoustic emissions are captured with the array of microphones, in this example with "n" microphones, shown in the top-left part of the illustration. The sound signals captured by the microphones are fed into the calculation unit which performs the transformation into "m" signals from different directions. As it is shown in the figure, the two-dimensional field of view can be divided into a group of sub-areas 1, 2, . . . , 9, . . . , m where each sub-area is linked with the acoustic signal strength obtained from that particular sub-area. The result is a group of signals 1, 2, 3, . . . , m. These values are then fed to an RMS calculating block (root mean square) before the result is fed to the computer.

Furthermore, going back to the start of the flow chart, the acoustic camera comprises an optical camera which is shown here as "C". The taken image or a sequence of image forming a video signal is also fed to the computer.

Instead or in addition to the m signals from step B fed directly to the computer, the signals may be discretely windowed (an example shows a windowing for a time length of 31.25 ms), before they are fed into use in the computer. A further alternative is to perform a mathematical operation for the windowed signals, which results in a group of metadata. The corresponding operations can in an embodiment be a Fast Fourier Transform (FFT), a Wavelet transform or calculating a Cepstrum for the signals. The obtained metadata is fed to the computer for further proceeding.

In an embodiment, the metadata is further subjected to the classification determination. It may be performed in the calculation unit or in the computer. This step corresponds to part 2) in step 42 of FIG. 4a, where the classification is performed in the calculation unit and fed to the computer.

The computer performs the next step of the invention, which is a conversion to a heatmap. The source information comprises the optical image (or video image) and the m signals from different directions obtained from part "B". The result of the conversion performed by the computer is a combined image of the imaged area together with a color map indicating spots of acoustic emissions.

After the calculations, any data obtained within the computer such as the combined color map image, windowed or non-windowed signals, metadata and/or classification results can be output for further use, analysis or presentation to the user, or to be saved into an external location. These actions are shown in FIG. 9 by feeding the combined image and other obtained data into a graphical user interface (GUI), such as on a touch screen of the acoustic camera. Further, the obtained data and the combined image can be sent into an external location (shown here as "Cloud") for further use in a selected external device. In an optional solution, where the classification has not yet been made, it can be performed in an external device, utilizing the data sent into it. As a summary, the displaying of the obtained data and the classification of the acoustic emissions may be performed outside the acoustic camera itself.

Regarding some other optional features available for the acoustic camera, acoustically insulating and/or absorbing material can be placed on top of the microphone PCB in one embodiment of the invention. Such an absorbing material, which attenuates unwanted sounds appropriately, can be a foam-like material. The absorbing material can be shaped in a layer form and have a thickness appr. between 1 . . . 2 cm. One possible material suitable for protecting the acoustic camera from high frequency noise is foam plastic with open cells. In one embodiment of the invention, the insulating material layer is provided with through-holes which locate on top of the microphone locations. In this way, the direct acoustic signals will reach the microphones, when the acoustic camera is pointed to the desired direction, but the acoustic noise arriving from the sides is attenuated by the insulating material. The whole insulating layer may finally be covered by a fabric which also protects the holes.

The user interface represented by the display is preferably a resistive touchscreen 13, 36b. The hardkeys may comprise an on/off switch (a power switch) and a selection set of keys comprising a left, right, up and down buttons together with a selection button (OK or "enter") in the middle. There can also be other hardkeys for other dedicated purposes.

Different physical entities of the acoustic camera are placed in a housing. In one embodiment, the acoustic camera comprises a handle for allowing manual and freely handheld usage scenarios for the device. In one embodiment, the power source for the acoustic camera, such as a battery arrangement, is placed inside the volume defined by the outer edges of the handle. Battery arrangement may comprise a single battery, or several battery units connected in a desired manner, utilizing serial and/or parallel connections.

In another embodiment, the acoustic camera with or without the handle can be attached to a fixed or movable structure or vehicle. Alternatively, the acoustic camera can be fixed to a pedestal (such as a tripod or a podium) or other kind of a base structure, which can be laid on the ground. In this way, the acoustic camera can be placed accurately in a certain location, and its alignment towards the interesting acoustic target can be selected and fixed accurately for the desired measurements.

In one embodiment, the measurements of acoustic emissions can be performed continuously, and in that case, selected windowing can be performed on the incoming acoustic emissions. For continuous measuring with the acoustic camera, video image is particularly useful. In that situation, the resulting acoustic image is created as a video image combined with appropriately updated colored acoustic emission map.

The application areas for the presented acoustic camera are incredibly various. Different kinds of gaseous or liquid leaks can be tracked with the acoustic camera. Possible types of leaks are pressurized gas or air leaks in the industry, gas leaks in hospitals and leaks in refrigeration apparatuses, and leaks in water vessels and other vehicles. Vacuum leaks are also trackable with the device. For instance, the presented acoustic camera can be used in tracking air leakages in parts manufactured using the vacuum assisted resin transfer molding (VARTM) process. With the VARTM method, the acoustic camera will track the critical air leak spot location or locations through detecting the sounds created by the air flowing through the leak spot(s). The acoustic camera is highly useful in these leak tracking applications because it can be used to achieve a full image of the whole environment under examination, and not just a single spot where the leak is expected to be.

One application area is examining the tightness of various structures, doors and elements, such as casings, housings, containers, fire-proof doors, cabins or cockpits of a ground, sea or air vehicle, storage rooms, refrigerating rooms, and other non-pressurized spaces. Testing of a structure or product can be performed by the acoustic camera e.g. by inserting pressurized gas or vacuum into the housing, and measuring the housing from different sides with the acoustic camera, which then reveals the leaking spots in the housing (gas flowing either in or out of the housing). Alternatively, the tightness can be examined using an acoustic source device, such as an ultrasound loudspeaker. The acoustic source device may be placed e.g. in the container, while the acoustic camera can be placed outside the container. This reveals the leaking locations within the examined structure. A further example for checking the tightness of a pipe, for instance, is to place the loudspeaker inside the pipe, while the acoustic camera is placed outside the pipe for measuring the possible acoustic leaks and their positions in the outer surface of the pipe.

One application area is examining the acoustic environment in office spaces, private homes, cultural venues such as concert halls, and the like. A loudspeaker functions as a sound source, while the acoustic camera can be used to investigate sound transmission routes, for example by locating reflections.

Next application area is various high voltage lines where different fault situations such as electric breakdown because of a non-sufficient insulation may occur. Such an electric breakdown often creates audible range and ultrasound signals which can be tracked with the acoustic camera. Generally, various connections, devices or parts of an electric system can be examined in this regard. The acoustic camera shows the complete image of the whole system, revealing locations where e.g. insulating material is not sufficient, and thus, an electric breakdown occurs.

One application area is using the acoustic camera in revealing small leaks in vehicle tyres. This can be extended to other parts of vehicle maintenance services, such as revealing leaks in air conditioning systems, checking tightness of the windows and checking the exhaust pipes of a vehicle.

An application area for the acoustic camera is using it in various construction sites to locate parts of structures that insulate sound poorly. The device can also be used to check the quality in all constructional seams and joints, and also the acoustic characteristics of the through-holes and using the measurements in finding possible cracks in the structures. The quality inspection comprising monitoring during the construction project can be performed with the device, and after the actual construction, the device can be used in tracking problematic locations regarding sound insulation. Various kinds of buildings can be acoustically checked, comprising multi-storied buildings, schools, public libraries, concert halls, office premises, just to name a few examples. Various businesses and e.g. municipal authorities can take advantage in using the device for these kinds of applications.

One application area is using the device in R&D projects for revealing the main noise source for various devices, machines, vehicles or other products. The main noise source may well indicate a location of an erroneous connection between parts or a malfunction in the operation of the device. Thus, the acoustic camera can be used in developing a product or machine with enhanced quality or operability.

As already referred above, an important application area is noise reduction for e.g. constructional elements of a building, or in a machine used in industry. For instance, the bearings of a motor may give an abnormal sound because of wear and tear. In that regard, the acoustic camera is a useful tool in maintenance actions of various industrial processes.

An additional application area is formed by various security and monitoring purposes, where the acoustic camera may monitor a space, alleyway or door for unauthorized intruders e.g. in warehouses, factories, office spaces, and private homes, for instance. Generally, the acoustic camera can be used as a visualization tool of sounds for e.g. educational and military use, and such visualizations can be also used by various businesses and public authorities, as already discussed above. Furthermore, regarding the possibility of military use and also training situations in the military, one further application would be using the acoustic camera in connection with a firearm. For instance, the acoustic camera, with its display, may be fixed to a firearm, e.g. to the outer edge of its barrel in a manner that the display is visible to the carrier of the firearm. The display may also be placed closer to the user. The acoustic camera can act as a tracking tool for various ambient sounds. The firearm user may combine the device with hearing protecting means such as ear protectors, to focus the attention on the sounds from the camera. Also, the acoustic camera fixed to the firearm can act as a tool for tracking even distant or non-line-of-sight originating sounds. One example for such military use or a related training session would be assisting the user in tracking the sounds which originate behind a wall, or behind a corner of a city block. The invention is also suitable to be applied with firearms meant for hunting use. Furthermore, the application areas extend to gaming and entertainment use, such as attaching the acoustic camera to an ink-ball weapon, for instance. Of course, the acoustic camera can act as an independent tool in games or entertainment use, or it can be attached to some other device, tool or element, than just weapons. One example is a treasure-hunting game for a group of players, where the device carried by each player may comprise a GPS functionality, and an acoustic camera functionality according to the invention.

The main advantage of the invention is that it allows to take an acoustic image of a larger area from a selected direction, and thus it obtains a complete view of a number of potential sound sources at once. Because the device is preferably a handheld device, it is highly maneuvreable in small spaces and difficult positions. Because the number of microphones is high, and the used calculation algorithms are efficient, the directional information of the sound sources are very accurate. The device provides good external connection possibilities. Also, the device has access to the internet, and services and analysis tools available in an external location. The rounded triangular shape of the device has the advantage that the sounds emerging from the direction of the user (behind the back of the human user pointing the acoustic camera directly in front of him/her) are well eliminated, and the focus remains in the sound sources present in front of the acoustic camera. Compared to prior art document "Benoit", the present invention can be built in a more compact housing because the digitalization of the sound signals must be performed by a separate A/D converter, while in the present invention this is directly performed through MEMS microphones. Compared to prior art document "Kim", the microphone arrangement in Kim is very specifically defined, while in the present invention the arrangement does not apply any branch-like structure. Also Kim requires more space in the housing of the device than the present invention, due to a separate A/D converter. Document Kim also has a separate user interface (a laptop computer) which results in more complex using of the system because it contains so many distinct operative parts. Furthermore, Kim takes the energy from the power supply mains, and thus, no internal battery is part of the device. This results in that Kim is a less mobile system while the present invention is a fully mobile system. Also the frequency range in the present invention is not as limited as in the prior art, where the prior art only applies frequencies under 20 kHz. Also the resolution and accuracy of the acoustic picture is clearly better in the present invention compared to solutions with only eight microphones.

A clear advantage is the presence of classification of sounds. It gives direct information of the source of the sounds, which might not be easily heard by the human ear at all. This characteristic makes the acoustic camera easily usable by any user, without extensive training for the use of the device. In finding various erroneous components and parts, the acoustic camera can directly solve the problem and indicate the reason behind e.g. a malfunction of a machine.

The present invention is not merely restricted to the examples presented above but the invention may vary within the scope of the claims.

The invention claimed is:
1. An acoustic camera, which comprises:
a housing;
an array of microphones configured to collect acoustic sound information and to convert the acoustic sound information into analog or digital sound signals, wherein the acoustic camera further comprises:
processing means configured to divide the sound signals into descriptive components and to determine sound levels in a plurality of directions in a field of view of the acoustic camera;
the processing means configured to convert the determined sound levels into a color map with different colors visualizing different sound levels;
an optical camera configured to take an image or video of the field of view; where the processing means configured to combine the color map with the taken image or video, thereby illustrating acoustic emissions as a combined image of the field of view of the acoustic camera, where the array of microphones, the processing means and the optical camera are integrated in the housing, wherein the acoustic camera further comprises a classification means configured to determine at least one classification result for the descriptive components, classification is performed using a data table, which comprises data of the descriptive components and at least one corresponding name or code describing a source or reason of at least one sound in the collected acoustic sound information, where an initial data table can be cognitively updated by a user, and wherein a cross-section of the acoustic camera is shaped in a form of a triangle with rounded corners, where the cross-section is parallel with the plane of the array of microphones.

2. The acoustic camera according to claim 1, wherein the descriptive components and determined sound levels are converted into metadata.

3. The acoustic camera according to claim 2, wherein the sound signals and/or the metadata is configured to be transmitted to an external device, in which the classification is configured to be determined.

4. The acoustic camera according to claim 1, wherein the array of microphones comprises 32-256 microphones.

5. The acoustic camera according to claim 1, wherein the array of microphones is located in a planar arrangement, or in a cylinder-shaped arrangement, or in a half-sphered arrangement.

6. The acoustic camera according to claim 1, wherein the acoustic camera is a hand-held device with the display pointing towards a user, and the array of microphones is pointable to a selected direction of potential sound sources, when the acoustic camera is in use.

7. The acoustic camera according to claim 1, wherein the name or the code comprises information of criticality of an error in the functioning of the device under test or of the device to be analyzed or of an equipment under test, or a parameter describing a condition of a machine or of a part of a machine.

8. The acoustic camera according to claim 1, wherein the data table is configured to be filled through a cognitive process where known sound sources result in certain characteristics of the descriptive components, either initially or during using of the acoustic camera with known noise sources.

9. The acoustic camera according to claim 1, wherein the acoustic camera comprises an alarming means configured to trigger a visual or audio alarm either in the acoustic camera or in an external device in case the classification of the descriptive components is critical, comprising a gas leak, an electric discharge, or a malfunction in a device, machine, vehicle or a system under test.

10. The acoustic camera according to claim 1, wherein an external loudspeaker is used in order to check the acoustic properties of various premises, structures, or elements, where the loudspeaker is configured to output a desired sound, and where the loudspeaker and the acoustic camera locate in non-line-of-sight configuration around the checked structure.

11. The acoustic camera according to claim 1, wherein the acoustic camera is applied in revealing various gas, liquid and vacuum leaks, in examining tightness of structures, elements or spaces, in detecting breakdown locations in high voltage lines or components, in vehicular leaks comprising tyre leaks, in construction quality determination, in noise reduction, in revealing malfunctioning machines and erroneous parts in an industrial process, in monitoring and security purposes for selected premises, in maintenance and R&D development work, in educational use, and in weapons, tools and devices suitable for gaming, hunting or military use.

12. The acoustic camera according to claim 1, wherein the acoustic camera comprises a handle for a user, where a volume defined by the handle comprises at least one battery supplying power to the acoustic camera.

13. The acoustic camera according to claim 1, wherein a layer of acoustically insulating material is placed on top of the array of microphones in order to attenuate acoustic noise arriving from the sides of the array of microphones.

14. A method for measuring, processing and visualizing acoustic signals, wherein the method comprises the steps of:

collecting acoustic sound information by an array of microphones;

converting the acoustic sound information into analog or digital sound signals;

dividing the sound signals into descriptive components and determining sound levels in a plurality of directions in a field of view of the acoustic camera;

converting the determined sound levels into a color map with different colors visualizing different sound levels;

taking an image or video of the field of view by an optical camera; and combining the color map with the taken image or video, thereby illustrating acoustic emissions as a combined image of the field of view of the acoustic camera, where the method further comprises the steps of determining at least one classification result for the descriptive components, performing classification by using a data table, which comprises data of the descriptive components and at least one corresponding name or code describing a source or reason of at least one sound in the collected acoustic sound information, where an initial data table can be cognitively updated by a user, and wherein a cross-section of the acoustic camera is shaped in a form of a triangle with rounded corners, where the cross-section is parallel with the plane of the array of microphones.

15. The method according to claim 14, wherein the method further comprises the step of:

determining an angle of an acoustic source in relation to the array of microphones by comparing the reception times and/or phases of the incoming acoustic sound information between the microphones.

16. The method according to claim 14, wherein the method further comprises the step of allowing the user to choose a frequency range of interest by configuring the filtering cut-off frequency for the collected acoustic sound information.

17. The method according to claim 14, wherein the method further comprises the step of placing an external loudspeaker to a space, and placing the acoustic camera behind a measured structure in view of the loudspeaker.

18. The method according to claim 14, wherein the method further comprises the step of filling the data table through a cognitive process where known sound sources result in certain characteristics of the descriptive components, either initially or during using of the acoustic camera with known noise sources.

19. The method according to claim 14, wherein the method further comprises the step of converting the descriptive components and determined sound levels into metadata, and transmitting the sound signals and/or metadata to an external device, in which the classification is configured to be determined.

20. A computer program product for measuring, processing and visualizing acoustic signals, where the computer program product comprises a non-transitory computer readable medium encoded with a computer program which is executable in a processor, and when the computer program is executed in the processor, it is configured to perform the steps of:

collecting acoustic sound information by an array of microphones;

converting the acoustic sound information into analog or digital sound signals;

dividing the sound signals into descriptive components and determining sound levels in a plurality of directions in a field of view of an acoustic camera;

converting the determined sound levels into a color map with different colors visualizing different sound levels;

taking an image or video of the field of view by an optical camera;

combining the color map with the taken image or video, thereby illustrating acoustic emissions as a combined image of the field of view of the acoustic camera;

determining at least one classification result for the descriptive components;

performing classification by using a data table, which comprises data of the descriptive components and at least one corresponding name or code describing source or reason of at least one sound in the collected acoustic sound information; and where an initial data table can be cognitively updated by a user, and wherein a cross-section of the acoustic camera is shaped in a form of a triangle with rounded corners, where the cross-section is parallel with the plane of the array of microphones.

* * * * *